June 10, 1930.  W. VOLTZ  1,763,491
WAVE PRODUCER FOR SWIMMING TANKS
Filed Oct. 30, 1929
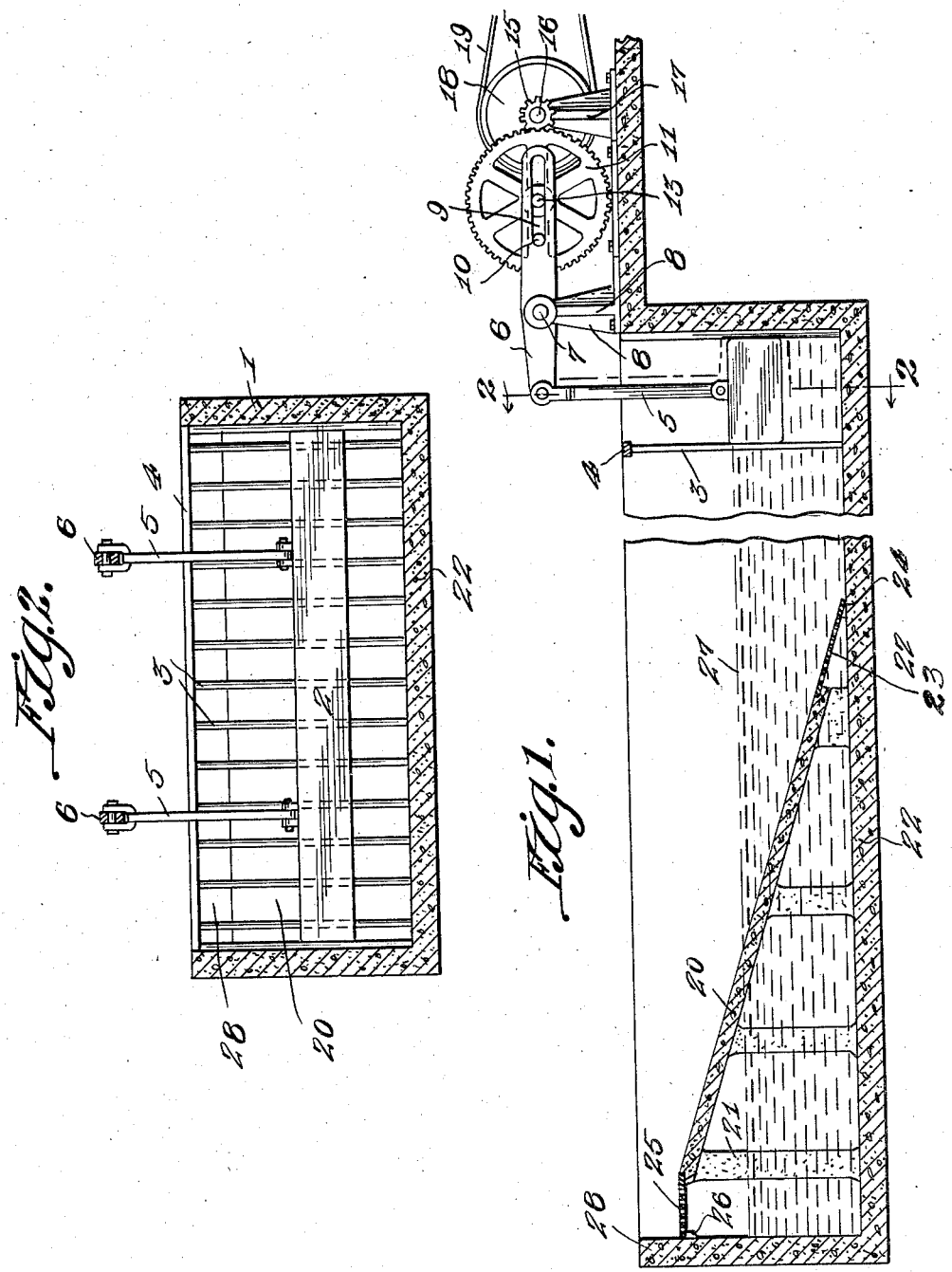
William Voltz,
INVENTOR
BY Victor J. Evans
ATTORNEY Patented June 10, 1930

1,763,491

UNITED STATES PATENT OFFICE

WILLIAM VOLTZ, OF RIDGEFIELD, WASHINGTON

WAVE PRODUCER FOR SWIMMING TANKS

Application filed October 30, 1929. Serial No. 403,623.

The object of the invention is the provision of a swimming tank in which plunger operated means is employed to agitate the water in the tank and in which such plunger means is guarded or protected from contact with the bathers so that no injury can be inflicted to the occupants of the tank.

A further object is the provision of a means for this purpose in which the inclined breaker has a flat top which is perforated or in the nature of a grating at the end of the tank disposed, of course, below the top of the tank and which has its lower or bottom portion likewise provided with a similar but inclined grating or reticulated plate and whereby the crest of the waves beating against the end of the tank will fall through the first mentioned grating and pass below the inclined breaker and through the last mentioned grating, and thereby avoiding an undertow of the water which would otherwise occur and consequently lessening the force of the waves and prohibiting any dangers of bathers by the action of the waves dashing against the end of the tank as would otherwise occur.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a substantially longitudinal sectional view taken through the improvement.

Figure 2 is a transverse sectional view on the line 2—2 of Figure 1.

In the drawings the numeral 1 designates a swimming tank which, of course, may be of any desired size and depth and which may be constructed of any desired material. In the showing of the drawings I arrange in the tank 1 a transversely disposed plunger 2. The plunger may be arranged upon suitable guides as disclosed by the drawings, the outer guides being in the nature of spaced posts 3 that afford a grating and the posts 3 have their upper ends or tops connected, as at 4, the said connecting element materially bracing and properly spacing the posts that constitute the grating from what I will term the rear of the tank. The plunger 2 is of a length approximately equaling the width of the tank 1, and the said plunger on its upper face has pivotally secured thereto a pair of spaced links 5. The links project a suitable distance above the top of the tank 1 and have their said projecting ends pivotally secured to rocker arms 6 which are pivoted, as at 7, upon suitable upstanding brackets 8 that are fixed on the top of the tank. Each rocker arm 6 has its rear end provided with an elongated slot 9 for a pin or roller 10 in the spoke of a toothed wheel 11. Two wheels 11 are employed but only one of the same is illustrated by the drawings. Each toothed wheel is fixed on a shaft 13 that is journaled in suitable bearings, and each wheel 11 is in mesh with a pinion 15 fixed on a shaft 16 that is journaled in a suitable bearing 17. On the shaft 16 there is fixed a belt wheel 18 over which there is trained a belt 19 that is operated by any suitable source of power. It is to be understood that while I have illustrated and described one means for imparting a vertical reciprocatory movement to the plunger 2 any other desirable means may be utilized.

In the tank, forward of the bars or the grating 3 there is an inclined plane 20. The plane 20 is in the nature of a wave breaker, and the same is supported from the bottom of the tank by suitable upstanding elements 21 which, of course, are suitably spaced from each other. The support 21 at the lower end of the breaker plane 20 is raised a suitable distance above the bottom 22 of the tank, and the lower corner of the breaker plane 20 is grooved for the reception of a reticulated plate 23, the outer edge of the plate being anchored, as at 24, in the bottom 22 of the tank 1. In lieu of the reticulated plate spaced bars may be employed. In any event the plate 23 is in the nature of a grating.

The top or elevated end of the breaker plane 20 is also grooved for the reception of a horizontally disposed grating 25 that has its outer or free end supported by means 26 that is integrally formed with one end of the tank 1.

The level of the water 27 in the tank is disposed a considerable distance below the grating 25. When the plunger 2 is vertically reciprocated it will be apparent that the water will be agitated and will be forced through the grating 3 onto the breaker plane 20, thus creating waves in the water. These waves ride over the inclined breaker plane and the crest of the waves will contact with the end wall 28 of the tank and will be directed through the grating 25. The agitated water will then flow beneath the inclined breaker plane 20 and find an outlet through the grating 23. Novices in swimming may rest upon the inclined breaker plane 20 and receive all of the delights of surface bathing, while expert swimmers may travel off of the inclined plane between the grating 23 and the vertical grating 3 and may thus swim in the deeper water.

Thus it will be noted that the device furnishes safe amusement for all classes of bathers and it is believed that the construction and advantages of the improvement will be understood and appreciated by those skilled in the art without further detailed description.

Having described the invention, I claim:

1. A swimming tank having an inclined plane therein and having gratings at the ends thereof, and a vertically movable reciprocatory plunger for agitating the water in the tank and to force the same in wave form over the inclined plane.

2. A swimming tank having an inclined plane therein, whose top is disposed below the top of the tank and whose bottom is likewise disposed below the bottom of the tank, a grating between one of the end walls and the top of the inclined plane, a grating below the lower wall of the inclined plane and the bottom of the tank, vertically disposed bars in the tank comprising a grating, connecting means for the bars, a plunger between one of the end walls and the bars, guide means for the plunger and means for imparting a vertical reciprocatory movement to the plunger, for the purpose set forth.

In testimony whereof I affix my signature.

WILLIAM VOLTZ.